United States Patent [19]

De John et al.

[11] 4,031,917

[45] June 28, 1977

[54] CONSTANT FLOW GAS REGULATOR

[76] Inventors: Charles R. De John, 35 Beverly Road, West Caldwell, N.J. 07006; Edwin L. Heger, 271 Henry St., Paramus, N.J. 07652

[22] Filed: Sept. 8, 1975

[21] Appl. No.: 611,009

Related U.S. Application Data

[63] Continuation-in-part of Ser. No. 458,520, April 8, 1974, abandoned.

[52] U.S. Cl. .............................. 137/613; 137/517; 251/121
[51] Int. Cl.² .................. F16K 15/14; F16K 17/24
[58] Field of Search ............ 137/505.13, 517, 521, 137/484.2, 484.4, 499, 525.3, 855, 613; 138/46; 251/121

[56] References Cited

UNITED STATES PATENTS

| | | | |
|---|---|---|---|
| 1,768,110 | 6/1930 | Boynton | 137/521 X |
| 1,796,440 | 3/1931 | Christensen | 137/454.4 |
| 2,062,341 | 12/1936 | Wells | 237/9 |
| 3,057,373 | 10/1962 | Bragg | 137/521 |
| 3,115,155 | 12/1963 | Clark | 137/517 X |
| 3,523,559 | 8/1970 | Gibson | 137/517 X |
| 3,911,988 | 10/1975 | Richards | 137/613 X |

FOREIGN PATENTS OR APPLICATIONS 801,926  5/1936  France ............................. 137/521

Primary Examiner—William R. Cline
Attorney, Agent, or Firm—Richard N. Miller

[57] ABSTRACT

A constant flow gas regulator apparatus adapted to be mounted inside of a vessel containing gas under high pressure which comprises an elongated regulator body having at least one flat surface, a conduit through said body with one end thereof terminating in an opening in the flat surface and an elongated, radiused, resilient spring reed having one end thereof operably secured to the flat surface with a portion of the reed extending over the opening in the flat surface in spaced relation thereto, whereby a substantially constant gas flow is maintained as the gas pressure in the vessel fluctuates or decreases. The regulator apparatus is particularly useful for metering oxygen from a portable container.

11 Claims, 6 Drawing Figures

CONSTANT FLOW GAS REGULATOR

This application is a continuation-in-part of our co-pending application Ser. No. 458,520 filed Apr. 8, 1974, now abandoned.

BACKGROUND OF THE INVENTION

This invention relates to a gas regulator apparatus adapted to be mounted inside of a vessel containing gas under high pressure for the purpose of maintaining a substantially constant flow of gas as the gas pressure either fluctuates within the vessel or decreases within the vessel due to the exhaustion of the gas. More specifically, the gas regulator apparatus comprises a regulator body having at least one flat surface and having a conduit therethrough with one end thereof terminating in the flat surface, and an elongated, radiused, resilient spring reed of appropriate dimensions mounted in spaced relation to the opening in the flat surface, whereby the gas pressure within the vessel maintains the reed and opening in the flat surface in spaced relationship as the gas pressure fluctuates or decreases so as to provide a substantially constant gas flow rate from the regulator. The described regulator apparatus is suitable for achieving a substantially constant flow rate within a high pressure gas vessel where the pressure fluctuates and is particularly suitable for use on portable oxygen containers where a specific rate of oxygen is prescribed by a physician for therapeutic purposes.

At the present time, small portable oxygen containers are used for therapeutic purposes by people who suffer from asthma, hay fever, respiratory ailments, various types of heart ailments, etc. These portable oxygen units come in varying sizes, with the weight ranging from about four pounds to a maximum weight of about thirty pounds so that the unit will be readily portable. The pressure in a full container generally ranges from about 1,000 pounds per square inch gauge (p.s.i.g.) to 2,000 p.s.i.g. The rate at which the oxygen is exhausted from the container usually is variable and uncontrolled because, unlike the large stationary units used in hospitals, such portable units usually do not include an external gas regulator valve. Such external regulator valves are heavy in weight, somewhat cumbersome and expensive and, thus, are not very compatible with portable oxygen units. Therefore, the present portable oxygen units lack a cheap, unsophisticated means of delivery the specific controlled volumes of gas prescribed volumes by doctors for their numerous patients.

SUMMARY OF THE INVENTION

In accordance with the present invention, an inexpensive, unsophisticated, lightweight apparatus is provided which provides a substantially constant gas flow rate and thereby overcomes the disadvantage discussed above. The described apparatus comprises a regulator body having at least one flat surface, a conduit through the body with one end thereof terminating in an opening in the flat surface, and an elongated, radiused, resilient spring reed having one end thereof operably secured to said surface, with a portion of the spring reed extending over the opening in the flat surface in spaced relation thereto such that the longitudinal axis of the reed is positioned above the opening, the surface area of the reed being about 15 to 100 times the surface area of the conduit opening in the flat surface, whereby the reed is maintained in spaced relation to the opening so as to maintain a substantially constant gas flow rate as the internal gas pressure in the vessel decreases or fluctuates over a wide pressure range.

When employed on a portable gas container, this regulator apparatus provides a substantially constant exhaust flow rate in the range of about two to about twenty liters per minute as the pressure in the gas container decreases from about 2,000 p.s.i.g. to about 50 p.s.i.g. However, a practical range for people using portable oxygen containers is about two to ten liters per minute. In addition, the regulator is lightweight and, therefore, does not materially increase the weight of the portable unit. Further, the regulator apparatus does not make the resultant portable unit more cumbersome because it is mounted inside of the container. This inside mounting feature also eliminates the possibility of an accidental or deliberate change in the rate prescribed for the user.

An important feature of the inventive regulator apparatus is the elongated, radiused, resilient spring reed. This reed must be properly dimensioned and properly located in spaced relation to the internal end of the conduit in order to control the gas flow rate. More specifically, the surface area of the reed must be from about 15 to 100, preferably 20 to 80, times the surface area of the conduit opening. Further, the thickness, resiliency and radius of curvature of the reed must be integrated with its surface area due to the coaction of the internal gas pressure and the resiliency or "memory" of the spring reed in order to enable the reed to respond to changes in internal gas pressure so that a substantially constant rate is obtained from the regulator. Such rate is believed to be due to the well-known Bernouilli principle.

Other distinctive features of the inventive regulator apparatus include location of the internal opening in a flat, preferably longitudinal, surface of similar dimensions to the reed and the presence of means for fastening thereon. In fact, the integral combination of the regulator body with the well-known Schrader valve in the preferred embodiment is unique because the resultant apparatus is particularly adaptable for use with the portable oxygen units.

BRIEF DESCRIPTION OF DRAWINGS

Specific embodiments of the invention have been chosen for purposes of illustration and description and are shown in the accompanying drawings wherein.

DETAILED DESCRIPTION

Figure 1:
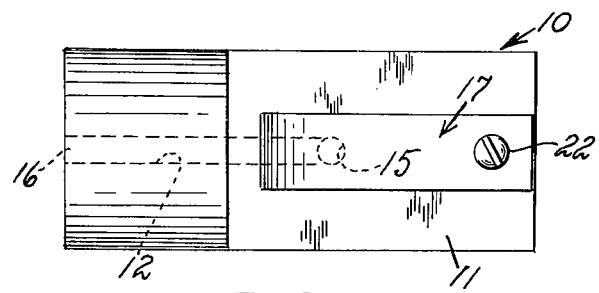
FIG. 1 is a top elevation of a gas regulator apparatus constructed in accordance with the invention.
Figure 2:
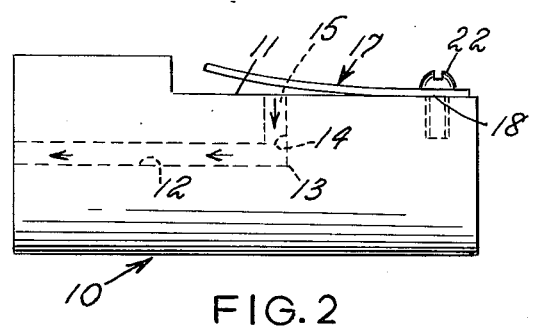
FIG. 2, is a side elevation of the apparatus of FIG. 1.
Figure 3:
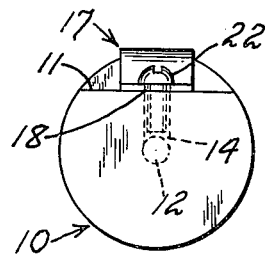
FIG. 3 is a right side view of the apparatus of FIG. 1.

Referring to FIGS. 1 – 3, the elongated regulator body 10 is cylindrical in shape. A portion of body 10 is milled to provide a flat, longitudinal surface or milled flat 11. A conduit 12 passes through regulator body 10. The low pressure end of conduit 12 is opening 16 and the high pressure end of conduit 12 is opening 15. Conduit 12 includes a right angle 13 and the vertical portion of conduit 12 is designated by the number 14. Conduit 12 is achieved by first making an axial bore in regulator body 10 and thereafter making a second bore at the selected location in the longitudinal axis of the flat, longitudinal surface 11 to intersect the axial bore at point 13. Of course, the vertical bore could be made first and the axial bore subsequently.

An elongated, radiused, resilient spring reed 17 is operably secured at one end of the reed to the flat, longitudinal surface 11 by a threaded fastener or screw 22. The point of attachment is designated by the numeral 18 and the point is located on the longitudinal axis of flat, longitudinal surface 11. The radiused, resilient spring reed 17 is generally rectangular in shape and is positioned over opening 15 in spaced relation thereto. The spring reed 17 has a curvature which is directly related to its radius and also has a "memory" due to its thin, resilient nature and the heat treatment conditions employed in fabricating the material of which reed 17 is constructed. As illustrated in FIG. 1, the surface area of reed 17 is very much greater than the area of opening 15 and the longitudinal axis of spring reed 17 is positioned over the center of opening 15. Thus, as shown in FIGS. 1 and 2, the spring reed 17 is spaced above opening 15 and completely covers the opening 15 in roof-like fashion.

The body 10 and spring reed 17 can be metallic or non-metallic, with metallic being preferred. More specifically, brass and brass alloys such as brass alloy 260 are preferred materials of construction for the body and spring reed due to their resistance to oxidation and their easy fabrication. Thermosetting and thermoplastic materials with proper flexibility and resiliency also may be employed, but such materials are less preferred. Suitable plastic materials include phenol formaldehyde, silicone, melamine formaldehyde, polystyrene, polymethyl methacrylate, polyvinyl chloride and acetate, urea formaldehyde, polyamide (Nylon 66), cellulosics (cellulose acetate, cellulose acetate butyrate and cellulose propionate), polycarbonate and polypropylene. In certain cases, the foregoing resins will have to be formulated with a suitable plasticizer according to known techniques. However, whether metallic or non-metallic materials of construction are employed, the individual parts can be manufactured easily and at low cost by automatic machining or injection molding techniques.

Figure 4:
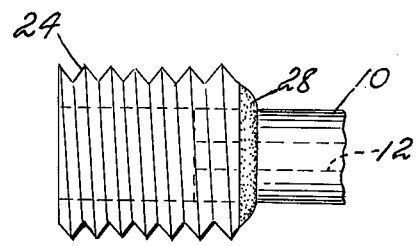
FIG. 4 is a side elevation of part of the apparatus of FIG. 1 in combination with means for fastening.

FIG. 4 depicts means for fastening 24 attached to body 10. The means for fastening 24 comprise a threaded connector attached to body 10 by an internal weld. Seal 28 is shown at the point where the means for fastening 24 slips over regulator body 10 and will prevent leakage when the apparatus is inserted into an appropriate connector on a portable oxygen tank. Such means for fastening facilitate attachment of the regulator apparatus of this invention to a suitable, portable gas reservoir. Naturally, other equivalent means for fastening obvious to those skilled in the art could be employed in place of the threaded connector.

Figure 5:
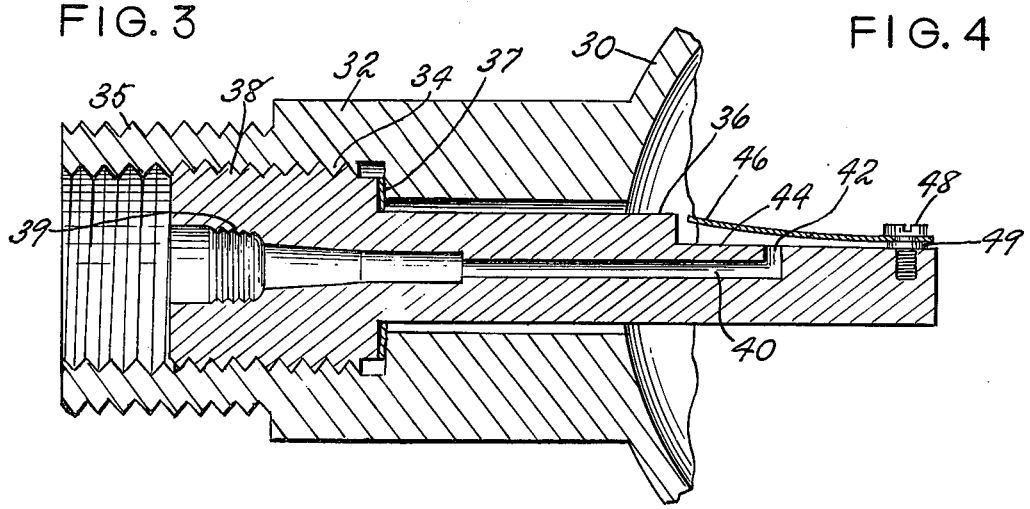
FIG. 5 is a side elevation in full section of a preferred apparatus installed on a portable oxygen unit.
Figure 6:
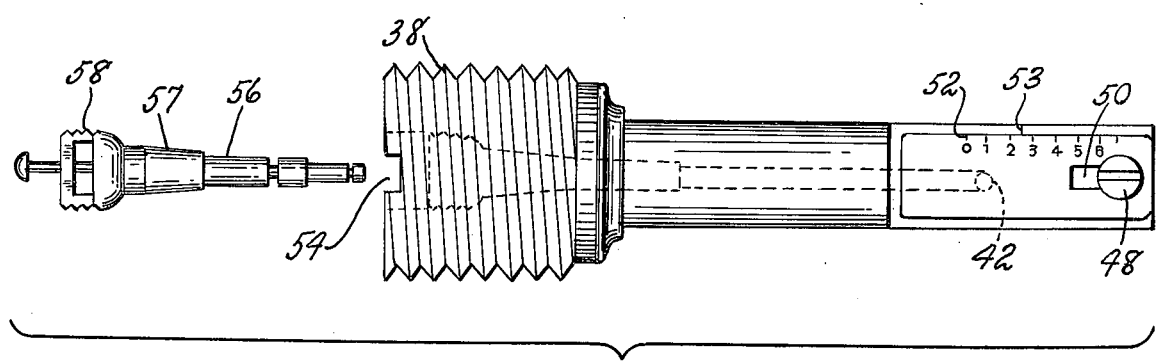
FIG. 6 is a top elevation of the apparatus of FIG. 5 removed from said portable oxygen unit and an exploded view of a Schrader valve means about to be inserted therein.

FIG. 5 illustrates a full section of a side elevation of a preferred gas regulator apparatus made in accordance with this invention in combination with a portable oxygen container 30 (shown in part). FIG. 6 depicts a top elevation of the apparatus of FIG. 5 without the portable oxygen container 30, but with an exploded view of a Schrader valve means 56 about to be inserted into valve body 38. The portable oxygen container 30 is spherical in shape with an attached spud 32 having internal threads 34 and external threads 35. Elongated regulator body 36 is integral with the means for fastening comprising Schrader valve body 38. Seal 37 is located at the point where the apparatus meets the internal shoulder on spud 32. Regulator body 36 is cylindrical and contains conduit 40 therethrough The horizontal section of conduit 40 is located at the axis of the cylinder and the conduit 40 terminates at opening 42 which is perpendicular to said axis. A flat, longitudinal surface 44 is provided on one side of body 36.

An elongated, radiused, resilient, spring reed 46 again is affixed to body 36 through a slotted opening 50 by fastening screw 48. Slotted opening 50 permits adjustment of the position of spring reed 46 with respect to opening 42. To further facilitate such adjustment witness marks 52 are provided on spring reed 46 and a corresponding witness mark 53 is provided on body 36. In addition, resilient washer 49 is located below reed 46 at the point of attachment to provide a means for adjusting the distance between spring reed 46 and body 36.

FIG. 6 discloses slot 54 in Schrader valve body 38 which facilitates insertion of said valve body 38 together with integrally attached gas regulator body 36 into spud 32 of container 30. Schrader valve means 56 are shown in an exploded view prior to insertion in said valve body 38. Threads 58 on said valve means 56 are attached to body 38 at 39 and seal 57 seals the valve means 56 to the valve body to prevent leakage.

A typical specimen of the preferred gas regulator apparatus of FIGS. 5 and 6 which is designed to provide a flow rate of about 6 liters per minute has an overall length of 2.0 inches. The Schrader valve fitting portion has an external diameter of 0.56 inches and a length of 0.53 inches and the regulator body has a diameter of 0.273 inches and a length of 1.468 inches. The spring reed is spring tempered brass alloy 260 shim stock and has the following dimensions: width — 0.223 inches; length — 0.66 inches; thickness — 0.009 inches; and radius of curvature — 5.4375 inches. The reed cooperates with a flat, longitudinal surface having a width of 0.248 inches and a length of 0.676 inches. An opening having a diameter of 0.062 inches is located in the longitudinal axis of the flat surface 0.515 inches from the far end of said surface. Thus, the ratio of the surface area of the reed to the surface area of the exhaust opening is about 48:1 and the reed extends 0.145 inches beyond the opening. Therefore, about 22% of the length of the reed extends beyond the center of the opening. Due to the radius of curvature of the spring reed, the actual effective area of the reed, that is, the area against which the internal gas pressure is free to act when the external valve of the gas container is opened, is only about two-thirds of the total area of the reed as indicated in the drawings.

As shown in FIG. 5, the foregoing specimen regulator apparatus including the integral Schrader valve body fastening means is dimensioned for easy insertion into the spud 32 which is attached to the four inch spherical, portable oxygen container. The spud 32 has a one inch outside diameter at its widest section and an internal diameter designed to accomodate the Schrader valve body 38. The regulator body 36 which is integrally attached to Schrader valve body 38 is 0.273 inches in diameter and readily insertable into the container through said spud 32. Additionally, the length of the regulator body 36 is dimensioned so that the spring reed 46 and cooperating flat, longitudinal surface 44 are located fully within the portable container 30. The inventive regulator apparatus becomes completely operable upon insertion of the well-known Schrader valve means 56 into the Schrader valve body 38 as shown in FIG. 6. The Schrader valve means 56 is attached to the valve body by screw threads 39 in the body and corresponding threads 58 on the valve means.

After the regulator apparatus has been attached to the portable gas container and the valve means have been inserted therein, the portable container may be filled with oxygen or any other desired gas through the Schrader valve in well-known fashion. Completion of the filling operation will be indicated by attainment of the appropriate pressure within the container as indicated by an appropriate pressure gauge.

In use, a hand actuator assembly is screwed onto the external threads 35 of Schrader valve body 38 and the flexible tube connected to an appropriate face mask is attached to the actuator assembly. The actuator assembly comprises a lever handle cooperating with a spring-maintained plunger unit which is effective to depress the Schrader valve pin upon actuation of the lever handle. The actuator assembly and the oxygen mask are standard items of commerce as are suitable equivalents which may be employed in their place. The particular actuator assembly described above is exemplary only.

Upon depression of the pin of Schrader valve means, the spring reed cooperates with the flat, longitudinal surface and the conduit opening therein to achieve a substantially constant flow of gas from the high pressure gas container. At maximum container pressure, the pressure above the spring reed forces the radius of the spring reed to become greater and causes the spring reed to flatten itself toward the milled flat when the Schrader valve means are opened. Such action serves to decrease the velocity of flow through the exhaust opening and to decrease the opening between the spring reed and the exhaust opening. As the internal pressure within the portable gas container decreases, the spring reed tends to return to its original radius due to its "memory," thereby causing the opening between the spring reed and the exhaust opening to increase and the rate of flow to increase. Such coaction between the internal gas pressure and the properly dimensioned spring reed and properly dimensioned opening is effective to achieve a substantially constant rate of flow from the container. Typical rates of flow at varying container pressures are set forth in Table I below.

TABLE I

| Container Pressure (p.s.i.g.) | Flow Rate (liters per minute) | | | | |
|---|---|---|---|---|---|
| 2000 | 10 | 8 | 6 | 3 | 2 |
| 1800 | 10 | 8 | 6 | 3 | 2 |
| 1600 | 9.95 | 8 | 6 | 2.95 | 2 |
| 1400 | 9.9 | 8 | 5.95 | 2.9 | 1.9 |
| 1200 | 9.9 | 8 | 5.9 | 2.9 | 1.9 |
| 1000 | 9.85 | 7.9 | 5.9 | 2.85 | 1.9 |
| 800 | 9.8 | 7.9 | 5.85 | 2.8 | 1.85 |
| 600 | 9.8 | 7.9 | 5.85 | 2.8 | 1.85 |
| 400 | 9.8 | 7.85 | 5.8 | 2.75 | 1.8 |
| 200 | 9.8 | 7.85 | 5.75 | 2.7 | 1.8 |
| 100 | 9.75 | 7.85 | 5.75 | 2.7 | 1.8 |
| 50 | 9.6 | 7.75 | 5.75 | 2.7 | 1.75 |

The foregoing tabulation indicates that the flow rate is substantially constant as the internal pressure decreases from 2,000 p.s.i.g. to 50 p.s.i.g. The maximum deviation from the preset or initial rate is less than 5% at the 10 liter per minute flow rate and about 12.5% at the 2 liter per minute flow rate.

The flow rate of each regulator apparatus is checked by inserting the apparatus into a standard sphere equipped with a pressure gauge. The sphere is pressurized to 2,000 p.s.i.g. with oxygen and the rate of flow is observed at varying gas pressures using a standard manometer gauge as the gas is exhausted from the sphere. Any necessary adjustment of the flow rate can be made upon removing the regulator apparatus by repositioning the spring reed using either slot 50 and optionally witness marks 52 or resilient washer 49 is employed. Of course, other equivalent adjusting means such as a micrometer adjustment also could be employed.

The design rate of flow is primarily determined by the area, thickness and radius of curvature of the spring reed, the surface area of the exhaust opening, the dimensions of the corresponding flat surface, and the spaced relationship of the reed and the exhaust opening. These factors must be properly integrated and correlated in order to achieve the desired flow rate. It is believed that the ratio of the surface area of the spring reed to the surface area of the exhaust opening is the primary factor which determines the flow rate from the high pressure gas storage vessels where the spring reed and flat surface are of similar dimensions and from about 15% to 30% of the length of the reed extends beyond the center of the exhaust opening. Again, either a lesser, i.e., 10%, or a greater, i.e., 40%, extension of the reed may be employed provided that the radius of curvature is correspondingly increased or decreased. Thus, proper dimensioning of the spring reed and exhaust opening to specific tolerances is significant in obtaining the desired flow rate.

While the inventive regulator apparatus has been illustrated as cylindrical in shape, it should be apparent that other shapes could be used so long as a flat surface of suitable dimensions is provided. Similarly, other fastening means could be substituted for the threaded nipple or Schrader valve body fastening means which likewise need not be integral with the regulator body. Also, a ball valve, plug valve or a slide valve may be attached to the fastening means portion of the gas regulator in place of the illustrated Schrader valve with equivalent results. If such valve substitution were made, the tubing from the oxygen face mask could be connected directly to a fitting attached to the outlet side of the selected valve and the aforementioned hand actuator assembly could be omitted as actuation of such a valve would initiate gas flow from the portable container. Finally, the cross section and location of the conduit could be varied from the circular cross section and axial location exemplified.

While the invention has been described with reference to certain embodiments and equivalents, it is not intended that such embodiments and stated equivalents shall be regarded as limitations upon the scope of the invention. It will be obvious to those skilled in the art that other modifications and variations of the invention can be made and other unspecified equivalents substituted therein without departing from the principles disclosed or going outside the scope of the specification.

What is claimed is:

1. A constant-flow gas regulator apparatus adapted to be mounted inside of a vessel containing gas under high pressure comprising an elongated regulator body having at least one flat surface, a conduit through said body with one end thereof terminating in an opening in said flat surface in communication with the interior of the vessel and its other end communicating with the exterior of the vessel, and an elongated, radiused, resilient spring reed having a radius of curvature throughout its entire length and having one end thereof operably secured to said surface with a portion of said spring reed extending over the opening in said surface in spaced relation thereto such that the longitudinal axis of said reed is positioned above said opening, the surface area of said reed being about 15 to 100 times the surface area of said conduit opening, whereby said spring reed is maintained in spaced relation to said opening so as to maintain a substantially constant gas flow rate from the regulator as the internal gas pressure in the vessel decreases or fluctuates over a wide pressure range.

2. The apparatus of claim 1 wherein said regulator body flat surface is located on a side of said body and said flat surface is longitudinal and said opening is said flat surface is in the longitudinal axis thereof.

3. The apparatus of claim 2 which further includes means for fastening at one end of said body.

4. The apparatus of claim 3 where said radiused spring reed has an elongated slot at its secured end whereby the reed can be slideably moved axially to said flat surface to adjust the distance between said spring reed and said opening to obtain the desired gas flow rate.

5. The apparatus of claim 4 wherein a series of witness marks are printed or stamped on the reed and at least one witness mark is stamped on said body for purposes of pre-setting or calibrating the gas flow through the apparatus.

6. The apparatus of claim 3 wherein a resilient washer is positioned between said radiused spring and said flat surface on said regulator body at its secured end and said means for securing is a holding screw whereby the radiused spring reed is made to move closer to or farther from said opening when said screw is turned clockwise or counter-clockwise so as to pre-set or calibrate the gas flow through the apparatus.

7. The apparatus of claim 3 wherein said regulator body is cylindrical, said conduit runs centrally through the axis of the cylinder and then at a right angle to said axis to said opening in said flat surface.

8. The apparatus of claim 7 wherein said conduit is circular in cross section.

9. The apparatus of claim 3 which includes, in addition, valve means.

10. The apparatus of claim 9 wherein said valve means is a Schrader valve.

11. The apparatus of claim 10 wherein the body of the Schrader valve is an integral part of said regulator body and said fastening means are external screw threads.

* * * * *